United States Patent
Van Den Eijkel et al.

(10) Patent No.: US 9,140,374 B2
(45) Date of Patent: Sep. 22, 2015

(54) DIRECTIONAL EXHAUST VALVE

(71) Applicant: Benteler Automobiltechnik GmbH, Paderborn (DE)

(72) Inventors: Pieter Van Den Eijkel, Würselen (DE); Leo Jans, HN Helmond (NL)

(73) Assignee: BENTELER AUTOMOBILTECHNIK GmbH, Paderborn (DE)

( * ) Notice: Subject to any disclaimer, the term of this patent is extended or adjusted under 35 U.S.C. 154(b) by 256 days.

(21) Appl. No.: 13/748,228

(22) Filed: Jan. 23, 2013

(65) Prior Publication Data
US 2013/0193363 A1 Aug. 1, 2013

(30) Foreign Application Priority Data
Jan. 31, 2012 (DE) .................. 10 2012 100 769

(51) Int. Cl.
*F16K 11/085* (2006.01)
*F16K 5/00* (2006.01)
*F16K 27/00* (2006.01)
*F02M 25/07* (2006.01)

(52) U.S. Cl.
CPC ............ *F16K 27/00* (2013.01); *F02M 25/0729* (2013.01); *F02M 25/0793* (2013.01); *F16K 11/085* (2013.01); *Y02T 10/121* (2013.01)

(58) Field of Classification Search
CPC .......... F02M 25/0729; F02M 25/0793; F16K 11/085; F16K 11/0853; F16K 11/0876; F16K 3/24
USPC ........ 137/625.46, 625.47, 876; 251/286, 287, 251/310
See application file for complete search history.

(56) References Cited

U.S. PATENT DOCUMENTS

| | | | | |
|---|---|---|---|---|
| 68,682 A * | 9/1867 | Armstrong | ..................... | 137/876 |
| 304,751 A * | 9/1884 | Kolla | ...................... | 137/625.31 |
| 850,762 A * | 4/1907 | Kolla | .............................. | 137/876 |
| 1,532,251 A * | 4/1925 | Lorraine | ...................... | 251/192 |
| 3,203,448 A * | 8/1965 | Jansen | ...................... | 137/625.41 |
| 4,049,105 A * | 9/1977 | Kindersley | .................. | 193/31 R |
| 4,679,983 A * | 7/1987 | Pietryk et al. | ................. | 415/148 |
| 6,187,148 B1 * | 2/2001 | Sturgulewski | ................ | 202/258 |
| 8,127,793 B2 * | 3/2012 | Ito et al. | .................... | 137/625.47 |

FOREIGN PATENT DOCUMENTS

| | | |
|---|---|---|
| DE | 101 33 182 | 1/2003 |
| DE | 10 2007 048 300 A1 | 4/2009 |
| DE | 10 2008 006 049 A1 | 7/2009 |
| EP | 1 273 786 A2 | 1/2003 |
| EP | 1 509 692 | 5/2009 |
| FR | 2 923 886 | 5/2009 |
| WO | WO 2010/0344 50 A1 | 4/2010 |

* cited by examiner

*Primary Examiner* — John Fox
*Assistant Examiner* — Seth W. Mackay-Smith
(74) *Attorney, Agent, or Firm* — Henry M. Feiereisen LLC (57) ABSTRACT

A directional exhaust valve for controlling a flow of exhaust gas includes a housing having an inlet port and at least two outlet ports. Arranged movably within the housing is a control element which has a passageway to connect the inlet port with at least one of the outlet ports while closing at least in part the other one of the outlet ports. The control element is configured in the form of a hollow cylinder which is closed on one end and has an outer surface area formed with an opening, with the passageway extending between an open end face of the control element and the opening.

18 Claims, 5 Drawing Sheets

DIRECTIONAL EXHAUST VALVE

CROSS-REFERENCES TO RELATED APPLICATIONS

This application claims the priority of German Patent Application, Serial No. 10 2012 100 769.1, filed Jan. 31, 2012, pursuant to 35 U.S.C. 119(a)-(d), the content of which is incorporated herein by reference in its entirety as if fully set forth herein.

BACKGROUND OF THE INVENTION

The present invention relates to a directional exhaust valve for switchable onward flow of exhaust gas.

The following discussion of related art is provided to assist the reader in understanding the advantages of the invention, and is not to be construed as an admission that this related art is prior art to this invention.

Throughflow of an exhaust gas within an exhaust system is normally controlled by flaps. This type of control is realized by a rotary or translational movement of an individual flap so that the opening cross section of the respective pipeline is influenced. Junctions within the exhaust system are used as bypass to disperse inflowing exhaust flow to at least two continuing pipelines or to conduct the exhaust flow to only one of the pipelines.

Temperatures along the exhaust system can greatly vary in dependence on the distance to the combustion chamber. This directly impacts the construction of required control elements which have to be configured to withstand stress in general and changing thermal stress.

In particular when exhaust gas recirculation (EGR) in motor vehicles is involved for nitrogen oxide reduction, the control elements should be arranged as close to the region of the combustion engine as possible. The control elements configured as bypass are hereby exposed to temperatures of up to 950° C. Besides the thermal stress, tightness and smoothness as well as acoustics and service life place further constraints on the design of control elements. Control elements used in exhaust systems require greater adjustment and holding forces in order to realize the movement when switching the exhaust flow, whereas lesser forces are needed in the EGR region because of the significantly smaller mass flow rate while tightness is a primary consideration.

There are various ways to construct control elements. Simple throttles are mounted for example on a rotary shaft which extends through the pipe cross section. Their use in the EGR-region is however unsuitable because of the stringent requirement for tightness. Other examples include valve flaps that move translatorily or rotary valves. Control elements including the accommodated flaps are operated using electric, pneumatic or hydraulic drives. Such a bypass is realized within the exhaust system by directional exhaust valves to control at least three pipelines converging at a junction. A problem encountered in this context is the realization of a force balance with respect to the axis of employed flaps.

It would be desirable and advantageous to provide an improved directional exhaust valve to obviate prior art shortcomings and to enable smooth operation while yet providing superior tightness and accompanying acoustics.

SUMMARY OF THE INVENTION

According to one aspect of the present invention, a directional exhaust valve for controlling an onward flow of exhaust gas includes a housing having an inlet port and at least two outlet ports, and a control element arranged movably within the housing and having a passageway to connect the inlet port with at least one of the outlet ports while closing at least in part the other one of the outlet ports, the control element being configured in the form of a hollow cylinder which is closed on one end and has an outer surface area formed with an opening, with the passageway extending between an open end face of the control element and the opening.

The configuration of the control element in the form of a hollow cylinder is especially beneficial. Not only is the strength of the control element improved and the shape stable as a result of the closed configuration but also the construction is overall enhanced as far as boundary conditions are concerned. In particular tightness of the control element is significantly improved against the inlet port and the outlet ports. The control element exhibits over its circumference a constant behavior, especially stretch behavior. As a result of the achieved precision of the contacting regions and components, the metallically sealed zones already satisfy the requirements for tightness in exhaust systems.

Depending on the configuration, a directional exhaust valve according to the invention may also be used in EGR systems.

The housing has advantageously a cylindrical configuration. Such a housing shape has the benefit of experiencing only slight thermal asymmetric housing distortion. This further enhances tightness between housing and control element.

According to another advantageous feature of the present invention, the control element can have a back wall in confronting relationship to the open end face, with the back wall having an arcuate cross section. The thus curved back wall of the control element is provided to form the passageway between the inlet port and at least one of the outlet ports. The arcuate shape enables a flow of exhaust gas through the directional exhaust valve in an optimum manner with little swirling and slight back pressure. In addition, the arcuate shape also contributes to an even distribution of possible stress within the rear wall of the control element in view of the absence of any sudden changes in cross section or overall configuration.

According to another advantageous feature of the present invention, the back wall can have a trapezoidal or triangular configuration extending towards the open end face of the control element. The hollow-cylindrical configuration of the control element is thus interrupted, at least in some areas, between both its ends by the arcuate back wall of the control element. The back wall may hereby itself be configured rectilinear or curved in a transverse direction to its arcuate profile. A rectilinear configuration is beneficial because the inlet port of the housing may for example have a round, especially circular cross section, whereas the outlet ports can have a square cross section. The passageway formed by the control element thus provides an optimal connection of the round cross section with the square cross section of the respective ports.

According to another advantageous feature of the present invention, the control element may have a shaft to support the control element within the housing. Advantageously, the shaft can be arranged on the control element in such a way as to support the entire control element on one side only. The one-sided support of the control element renders the entire directional exhaust valve very compact.

Bearing-mounting the control element within the housing enables a rotary or translatory movement of the control element. Thus, a displacement of the control element or a rotation thereof can be used for switching between the respective paths for the exhaust gas through the directional exhaust valve. Advantageously, switching over of the directional exhaust valve can be realized by a rotary movement of the control element.

According to another advantageous feature of the present invention, the control element can be mounted for rotation about a longitudinal axis of the shaft by an angle of 0° to 125°. For a configuration with a single inlet port and two outlet ports, it may be adequate to reduce the angle to a range from 0° to 120°. It is, of course, also conceivable to increase the angle beyond 125° in the event the arrangement and number of outlet ports dictate such an angle range.

According to another advantageous feature of the present invention, a bearing can be disposed opposite to the inlet port of the housing to guide the shaft of the control element. As a result, the open end face of the control element in the form of a hollow cylinder can be best suited to the advantageously also round inlet port of the housing. Advantageously, the longitudinal axis of the shaft coincides with an axis which connects the center of the inlet port with the bearing that supports the shaft. As a result, the open end face of the hollow-cylindrical control element can be maintained in alignment with the round contour of the inlet port during rotation about the longitudinal axis of the shaft so as to avoid the presence of unwanted cross sectional jumps or cross sectional changes in the transition zone between the inlet port of the housing and the further course of the passageway through the control element during rotation of the control element. Moreover, such a configuration provides benefits with respect to the required seal in the transition zone between the inlet port of the housing and the open control element, especially in the area of the end face thereof.

According to another advantageous feature of the present invention, the control element can have at least two ribs arranged in confronting relationship. "Confronting relationship" relates hereby to a diametrical arrangement and to an arrangement that deviates there from. Advantageously, the ribs are configured as outer vanes which are arranged in parallel relationship on the outer surface area of the control element, and the ribs can be sized to extend up to the shaft while incorporating the back wall. In this way, the outer contour of the control element as formed by the ribs can be best suited to the inner contour of the housing. Shape and disposition of the ribs complement hereby the inner contour of the housing as closely as possible. A superior tightness can hereby be established in the transition zone between ribs and housing inner wall. Even when the ribs are provided with sealing elements against the inner wall of the housing, the ribs can be configured such as to be oriented without contact towards the inner surface of the housing, when the control element rotates within the housing.

Even when the ribs are aligned on the control element within the same plane, the ribs can be configured about the longitudinal axis of the shaft to define an angle of 90° to 125° there between. Advantageously, the housing has an inner wall which can be formed with at least three rails configured in correspondence to the ribs. The rails can, for example, be configured to achieve a superior tightness with the ribs of the control element when aligned with the ribs. The ribs of the control element and the rails on the inner wall of the housing may be suited to one another in such a way as to touch one another in circumferential direction of the control element and thus laterally, when the control element rotates. Thus, the ribs and the rails have at least some overlapping regions. In other words, an outer envelope circle which includes the ribs of the control element has a greater cross section than an inner envelope circle defined between the rails inside the housing.

According to another advantageous feature of the present invention, two of the rails can be configured about the longitudinal axis of the shaft to define an angle of 90° to 125° there between. Such an arrangement of the rails inside the housing limits the rotation of the control element to an angle of 0° to 125° about the longitudinal axis. The rails form a stop for the ribs of the control element. Advantageously, the rails are spaced from one another in symmetry within the housing so as to define an angle of 120° there between. In this way, the rails can further stiffen the housing symmetrically distributed within the housing.

According to another advantageous feature of the present invention, the open end face of the control element can be formed with a circumferential collar. The thus-established ring about the open end face of the hollow-cylindrical control element improves stiffening of the control element. The collar can be used to also seal the control element in a region of the inlet port against the housing. Even though the sealing effect of the collar is at the end face and thus parallel to the longitudinal axis with respect to the housing, the seal is advantageously established radially. Thus, in the region of the inlet port, the housing has advantageously a round contour against which the circumferential collar of the control element radially seals.

According to another advantageous feature of the present invention, the back wall of the control element can be sized to define a gap to the housing in a region of the opening to connect the passageway with an intermediate space which is defined between the housing and the control element. The presence of the intermediate space between the outer surface area of the control element and the inner wall of the housing is advantageous because it can be filled with a fluid as insulation in an area between the ribs. This insulation decouples the control element, which conducts hot exhausts, from the housing so that the housing is exposed to little thermal stress. In addition, as the outer surface area of the housing is heated to a lesser extent than the control element, it can be placed in closer proximity to surrounding, possibly heat-sensitive components.

The present invention realizes a very compact construction of a directional exhaust valve which in view of the cylindrical configuration of the housing and the control element undergoes only slight asymmetric distortion as a result of thermal stress. In particular the one-side support of the control element within the housing contributes to the compact construction. Only slight actuation forces are needed for switching the directional exhaust valve because of the hollow-cylindrical configuration of the control element and also because of the optimized guidance of the exhaust gas through the directional exhaust valve. An important aspect is hereby the configuration of the passageway which is routed through the directional exhaust valve and formed by the arcuate back wall of the control element. Exhaust gas is deflected hereby in the area of the curved back wall of the control element so that deflection forces are absorbed in the area of the shaft which is connected to the control element. As these deflection forces are introduced substantially axially into the shaft of the control element, the presence of a one-sided load and especially a load that could cause a deflection of the control element from its normal position is significantly reduced.

Moreover, as the control element is bearing-mounted via its shaft in the area of the intermediate space between the control element and the housing, the presence of the standing fluid insulates the bearing and thus provides a thermal decoupling.

BRIEF DESCRIPTION OF THE DRAWING

Other features and advantages of the present invention will be more readily apparent upon reading the following descrip

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
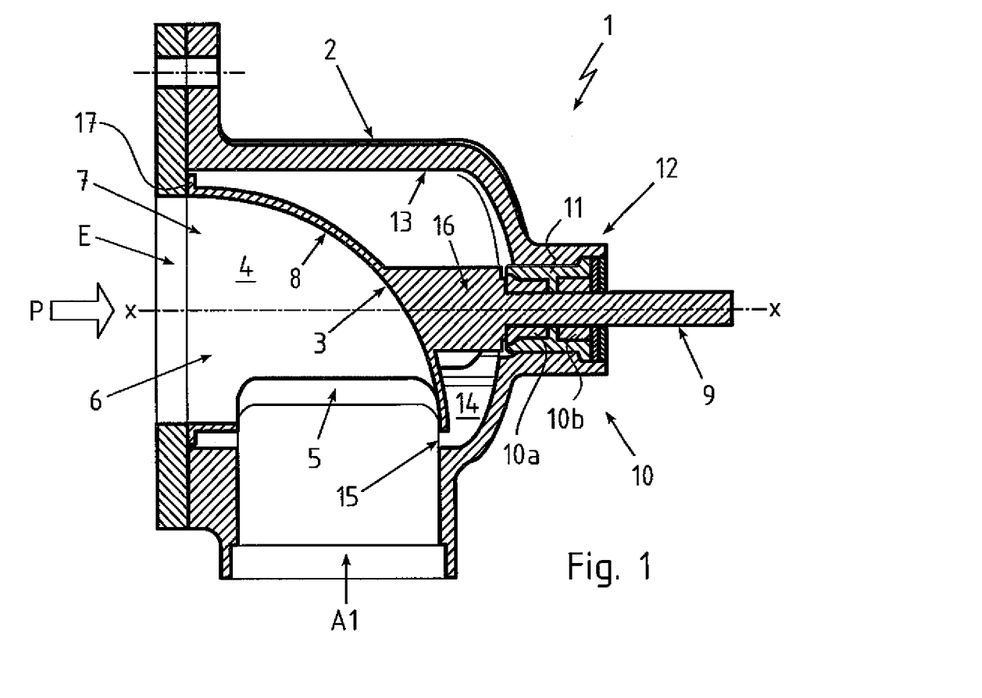
- FIG. 1 is a sectional view of a directional exhaust valve according to the present invention.
Figure 7:
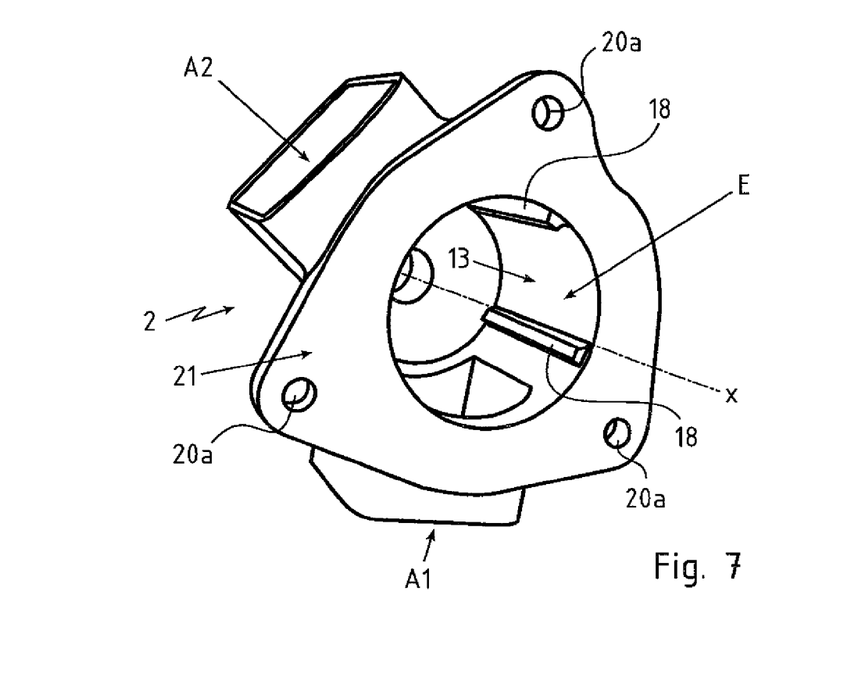
FIG. 7 is a perspective view of the housing of the directional exhaust valve of FIG. 1.

Turning now to the drawing, and in particular to FIG. 1, there is shown a sectional view of a directional exhaust valve according to the present invention, generally designated by reference numeral 1. The directional exhaust valve 1 includes a generally cylindrical housing 2 and a control element 3 which is movably received in the housing 2. To enable a switchable onward flow of exhaust gas, the housing 2 has an inlet port E and at least two outlet ports A1, A2 (FIG. 7). The view of FIG. 1 shows only the outlet port A1.

The control element 3 disposed within the housing 2 is shown in FIG. 1 in a position in which the inlet port E is connected with at least the outlet port A1 via a passageway 4. As a result of the configuration of the control element 3 and the disposition of the outlet ports A1, A2 on the housing 2, at least one of the outlet ports A1, A2 is closed, at least in part, with respect to the inlet port E, in dependence on the position of the control element 3.

The control element 3 has an outer surface area 6 which is formed with an opening 5 which can be brought into registry with the outlet ports A1, A2 to form the passageway 4. As a result, the passageway 4 extends between an open end face 7 of the control element 3, which end face 7 confronts the inlet port E, and the opening 5.

As can be seen from FIG. 1, the control element 3 has a back wall 8 placed in opposite relationship to the open end face 7 of the control element 3 and having an arcuate cross section. The control element 3 has a shaft 9 by which the control element 3 is bearing-mounted within the housing 2. The shaft 9 is hereby arranged on a side of the control element 3 that faces away from the passageway 4 and thus from the inlet port E. A bearing, generally designated by reference numeral 10 supports the shaft 9 in the housing 2 and thus guides the shaft 9 at a location which is distal to the inlet port E of the housing 2.

The bearing 10 includes two bearing units 10a, 10b which may be configured, for example, as sliding bearings, ball bearings, or roller bearings. The type of bearing used here depends in particular on the encountered thermal stress in this region.

In the non-limiting embodiment shown in FIG. 1, both bearing units 10a, 10b are arranged within a sleeve 11 arranged in a neck 12 of the housing 2. The shaft 9 and the sleeve 11 together with the neck 12 are oriented on a common longitudinal axis x which extends through a center Z of the inlet port E.

Formed between the curved back wall 8 of the control element 3 and an inner wall 13 of the housing 2 is an intermediate space 14 which is filled with standing fluid as insulation, when the directional exhaust valve 1 is operative. The fluid may hereby reach the intermediate space 14 via a gap 15 formed here between the housing 2 and the control element 3. In particular, the gap 15 is formed between the housing 2 and the back wall 8 of the control element 3 in the region of the opening 5. Examples of fluid include standing air or standing exhaust.

In the area of the intermediate space 14, the shaft 9 is formed with a wider section 16 which extends between the sleeve 11 of the bearing 10 and the curved back wall 8 of the control element 3. The wider section 16 supports the control element 3 in the direction of the longitudinal axis x against the bearing 10. As a result, forces caused by the flow of exhaust gas during operation of the directional exhaust valve 1 in the direction of arrow P are directly conducted in the direction of the longitudinal axis x into the bearing 10 and thus into the housing 2 in the region of the neck 12.

The control element 3 has a circumferential collar 17 in the area of its open end face 7. The collar 17 provides a seal of the control element 3 in the region of the inlet port E against the housing 2. For that purpose, the collar 17 is configured transversely to the longitudinal axis x such as to be arranged as close as possible to the inner wall 13 of the housing 2.

Figure 2:
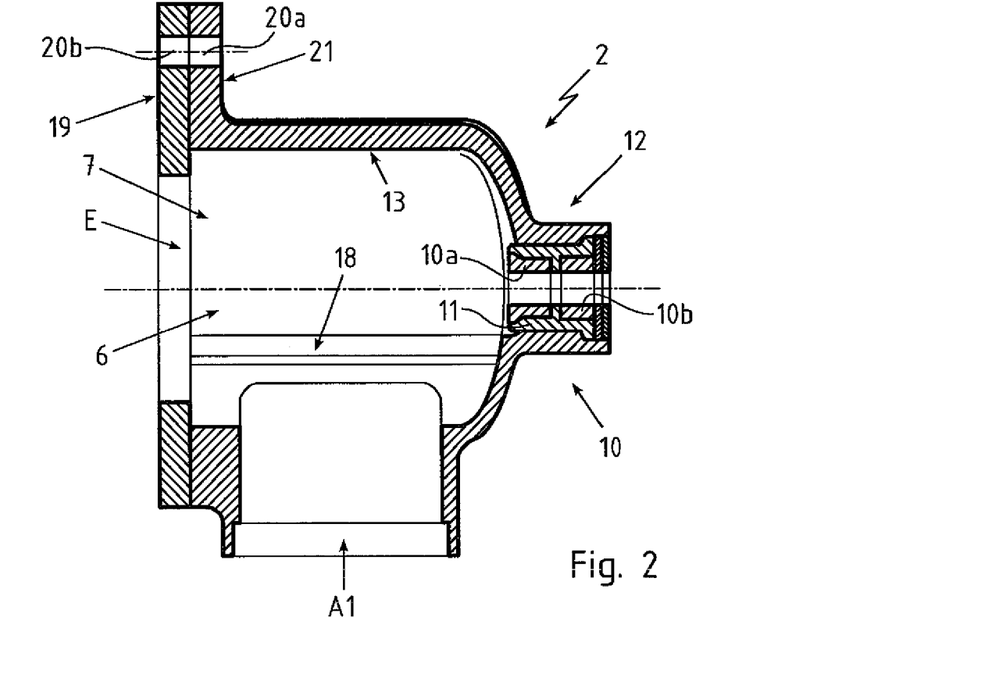
FIG. 2 is a sectional view of a housing of the directional exhaust valve of FIG. 1 without depiction of a control element.

FIG. 2 is a sectional view of the housing of the directional exhaust valve 1 without depiction of the control element 3, and illustrates the presence of a rail 18 formed inside the housing 2 and extending in parallel relationship to the longitudinal axis x along the inner wall 13 of the housing 3.

Both FIGS. 1 and 2 also show the provision of a flange 19, when the housing 2 is coupled. The flange 19 is hereby connected to a not shown structure of, for example, an exhaust system. The housing 2 and the flange 19 are secured via at least one throughbore 20a of a collar 21 arranged in the region of the inlet port E, with the throughbore 20a being in alignment with a throughbore 20b in the flange 19. The housing 2 and the flange 19 may be connected by a detachable fastener which is not shown in detail.

Figure 3:
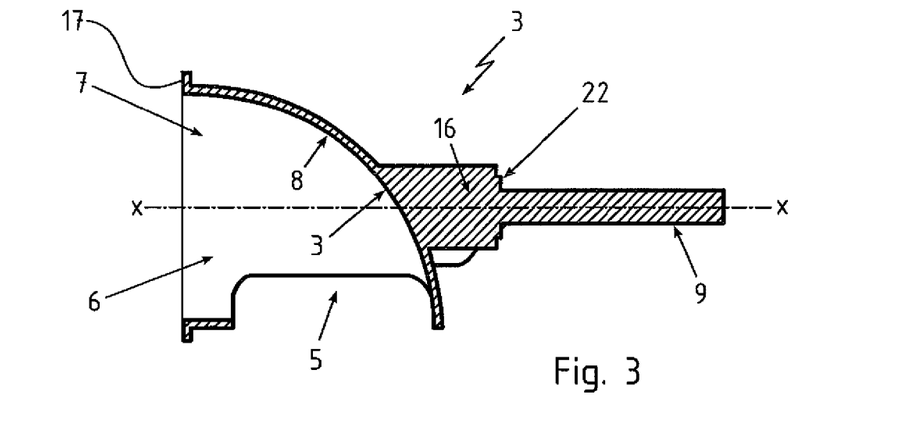
FIG. 3 is a sectional view of the directional exhaust valve of FIG. 1 in the absence of the housing to show the control element of the directional exhaust valve.

As can be seen from FIG. 3, which is a sectional view of the control element 3, the shaft 9 is provided in the region of the wider section 16 with a shoulder 22 which is oriented towards the bearing 10, when the control element 3 is assembled with the housing 2 (not shown in FIG. 3). The shoulder 22 provides a suitable buttress for the bearing unit 10a which faces the intermediate space 14 of the housing 2.

Figure 4:
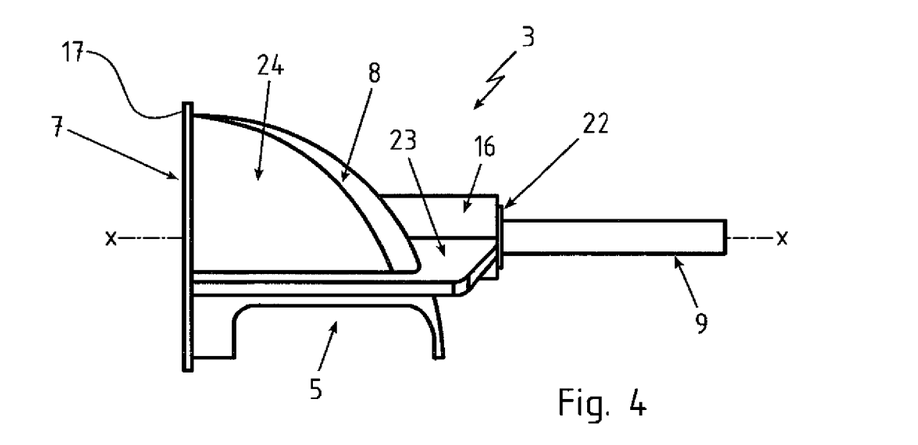
FIG. 4 is a side view of the control element of the directional exhaust valve.

FIG. 4 is a side view of the control element 3 of the directional exhaust valve 1 and it can be seen that the control element 3 has at least one rib 23a which is arranged on the outer surface area 24 of the control element 3 in parallel relationship to the longitudinal axis x. The rib 23a incorporates the curved back wall 8 of the control element and extends to the wider section 16 and up to the shaft 9.

Figure 5:
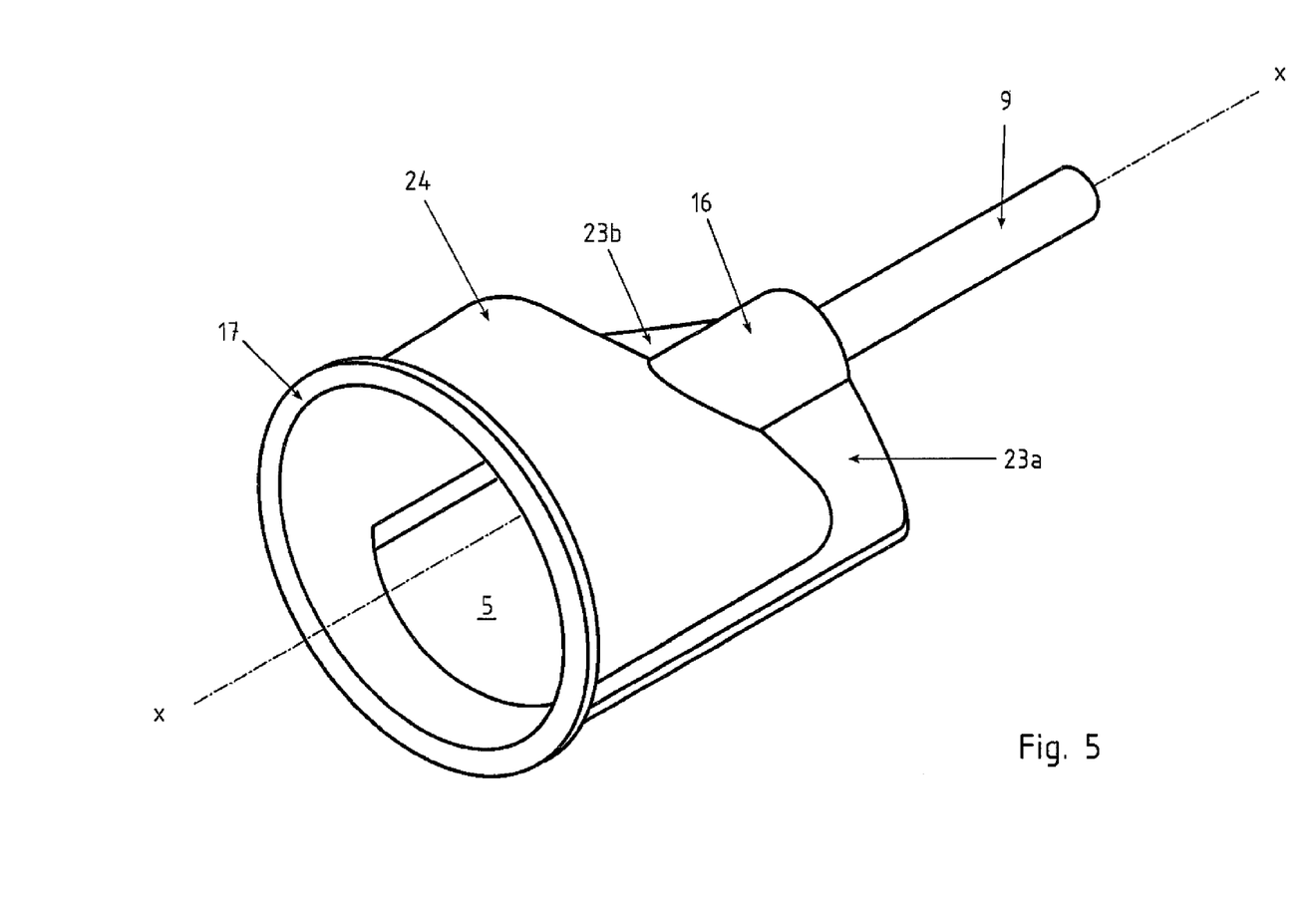
FIG. 5 is a perspective view of the control element of the directional exhaust valve.

FIG. 5 is a perspective view of the control element 3 and it can be seen that the rib 23a is complemented by a further rib 23b. As a result, the outer surface area 24 of the control element 3 is thus embraced, at least in part, by the ribs 23a, 23b which extend toward the wider section 16 of the shaft 9. FIG. 5 further clearly shows that the control element 3 is configured as a hollow cylinder which is closed on one side.

Figure 6:
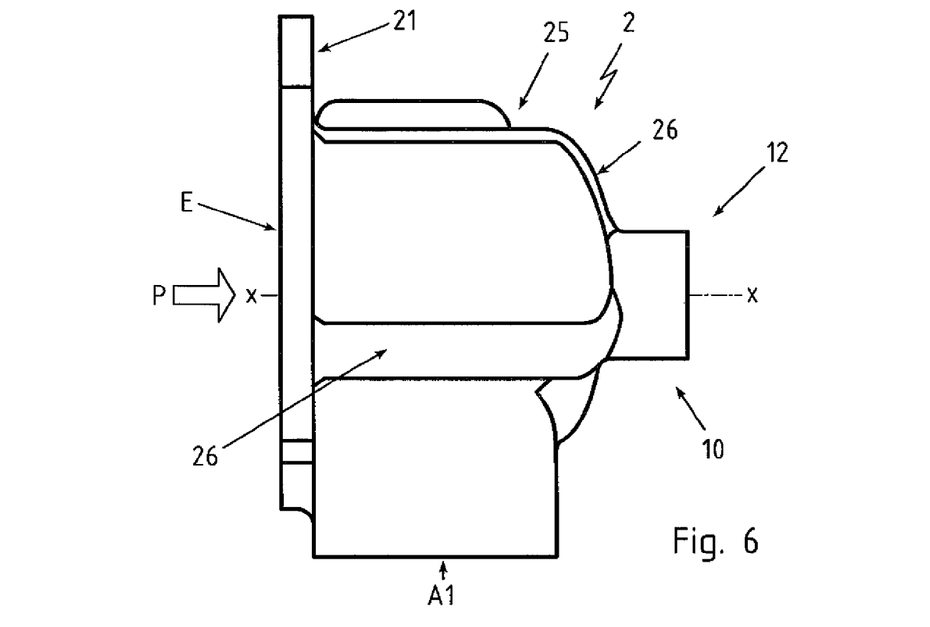
FIG. 6 is a side view of the housing of the directional exhaust valve of FIG. 1.

FIG. 6 is a side view of the housing 2 of the directional exhaust valve 1 and it can be seen that the housing 2 has an outer side 25 formed with elevations 26 which extend in the direction of the longitudinal axis x from the collar 21 of the housing 2 to the neck 12 opposite to the collar 21. The elevations 26 are disposed in a manner not shown in detail in the region of the rail 18 arranged inside the housing 2. Although not shown in detail, the elevations 26 have a thickness in cross section which is greater than a thickness of the rail 18. This facilitates manufacture. For example, the rail 18, not shown here, may have a groove which extends in the direction of the longitudinal axis x to provide a continuous planar support surface for the not shown ribs 23a, 23b of the control element 3.

FIG. 7 is a perspective illustration of the housing 2 of the directional exhaust valve 1 to provide a view through the inlet port E into the interior of the housing 2. As can be seen, the rails 18 are arranged in spaced-apart relationship on the inner wall 13 of the housing 2. Further shown is the outlet port A2.

Figure 8:
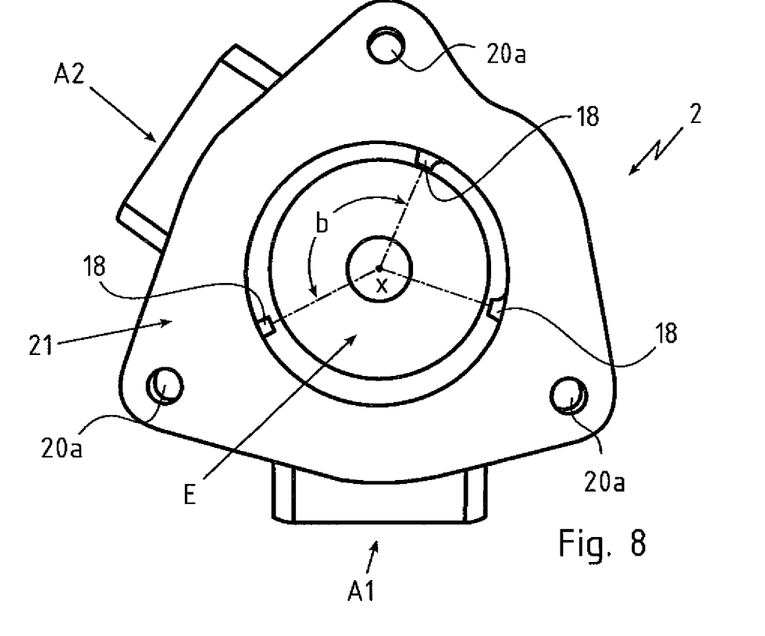
FIG. 8 is a front view of the housing of the directional exhaust valve of FIG. 1.

FIG. 8 is a front view of the housing 2 to more clearly show the arrangement of the rails 18 inside the housing 2. In the non-limiting example, the housing 2 has at least three rails 18 configured to complement the not shown control element 3 and its ribs 23a, 23b, when the housing 2 is assembled. Advantageously, the rails 18 are arranged in such a manner that two of the rails 18 are spaced at an angle b of 90° to 125° about the longitudinal axis x.

Figure 9:
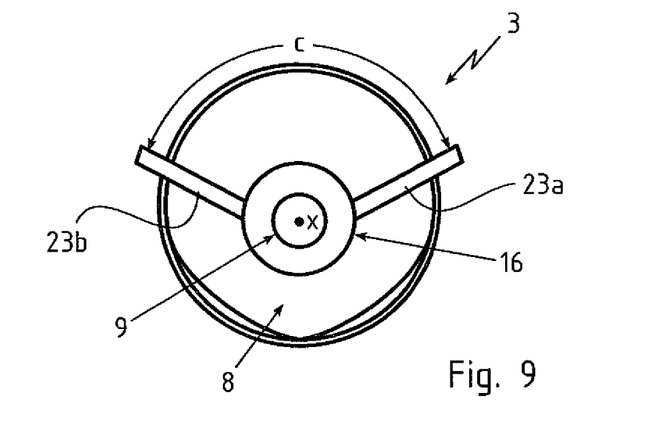
FIG. 9 is a rear view of the control element of the directional exhaust valve.

FIG. 9 is a rear view of the control element 3. When viewing towards the shaft 9 and its wider section 16, it can be seen that the two ribs 23a, 23b do not extend in a same plane. Advantageously, the ribs 23a, 23b define an angle c of 90° to 125° about the longitudinal axis x.

As a result of the arrangement of the rails 18 inside the housing 2 and the arrangement of the ribs 23a, 23b on the outer surface area 24 of the control element 3, the control element 3 can be rotated about the longitudinal axis x by an angle of 0° to 125°, when the directional exhaust valve 1 is assembled.

FIG. 9 further shows the trapezoidal or triangular profile of the curved back wall 8 of the control element 3 in a direction towards the not shown open end face 7 of the control element 3.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A directional exhaust valve for controlling an onward flow of exhaust gas, said directional exhaust valve comprising:

a housing having an inlet port and at least two outlet ports; and a control element arranged movably within the housing and having a passageway to connect the inlet port with at least one of the outlet ports while closing at least in part the other one of the outlet ports, said control element having a shaft which supports the control element within the housing and being configured in the form of a hollow cylinder which is closed on one end and has an outer surface area formed with an opening, said passageway extending between an open end face of the control element and the opening, wherein the control element has at least two ribs arranged on the outer surface area of the control element, said ribs extending in parallel relationship to a longitudinal axis of the shaft up to the shaft and configured about the longitudinal axis to define an angle of 90° to 125° there between.

2. The directional exhaust valve of claim 1, wherein the control element has a back wall in confronting relationship to the open end face, said back wall having an arcuate cross section.

3. The directional exhaust valve of claim 2, wherein the back wall has a trapezoidal or triangular configuration extending towards the open end face of the control element.

4. The directional exhaust valve of claim 2, wherein the ribs are configured to incorporate the back wall.

5. The directional exhaust valve of claim 2, wherein the back wall of the control element is sized to define a gap to the housing in a region of the opening to connect the passageway with an intermediate space which is defined between the housing and the control element.

6. The directional exhaust valve of claim 1, wherein the control element is mounted for rotation about the longitudinal axis of the shaft by an angle of 0° to 125°.

7. The directional exhaust valve of claim 1, further comprising a bearing disposed opposite to the inlet port of the housing and supporting the shaft.

8. The directional exhaust valve of claim 1, wherein the housing has an inner wall formed with at least three rails configured in correspondence to the ribs.

9. The directional exhaust valve of claim 1, wherein the open end face of the control element is formed with a circumferential collar which seals the control element in a region of the inlet port against the housing.

10. A directional exhaust valve for controlling an onward flow of exhaust gas, said directional exhaust valve comprising:

a housing having an inlet port and at least two outlet ports, said housing having an inner wall formed with at least three rails; and a control element arranged movably within the housing and having a passageway to connect the inlet port with at least one of the outlet ports while closing at least in part the other one of the outlet ports, said control element having a shaft which supports the control element within the housing and being configured in the form of a hollow cylinder which is closed on one end and has an outer surface area formed with an opening, said passageway extending between an open end face of the control element and the opening, wherein the control element has at least two ribs arranged on the outer surface area of the control element, said ribs sized to extend up to the shaft, wherein two of the rails are configured about a longitudinal axis of the shaft to define an angle of 90° to 125° there between.

11. The directional exhaust valve of claim 10, wherein the rails are configured in correspondence to the ribs.

12. The directional exhaust valve of claim 10, wherein the control element has a back wall in confronting relationship to the open end face, said back wall having an arcuate cross section.

13. The directional exhaust valve of claim 12, wherein the back wall has a trapezoidal or triangular configuration extending towards the open end face of the control element.

14. The directional exhaust valve of claim 12, wherein the back wall of the control element is sized to define a gap to the housing in a region of the opening to connect the passageway with an intermediate space which is defined between the housing and the control element.

15. The directional exhaust valve of claim 10, wherein the control element is mounted for rotation about the longitudinal axis of the shaft by an angle of 0° to 125°.

16. The directional exhaust valve of claim 10, further comprising a bearing disposed opposite to the inlet port of the housing and supporting the shaft.

17. The directional exhaust valve of claim 10, wherein the ribs are configured to incorporate the back wall.

18. The directional exhaust valve of claim 10, wherein the open end face of the control element is formed with a circumferential collar which seals the control element in a region of the inlet port against the housing.

\* \* \* \* \*